May 9, 1961  T. S. MARSHALL  2,983,796
MOVING COIL PICK-UPS FOR PHONOGRAPHS AND THE LIKE
Filed May 15, 1956
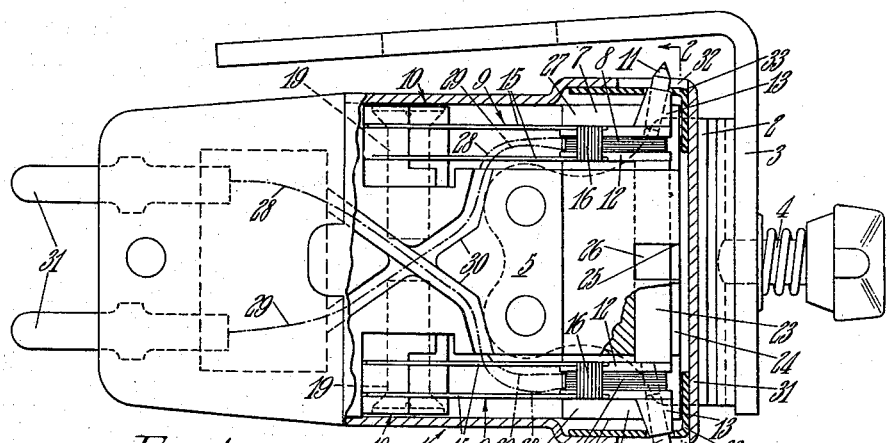

2,983,796
MOVING COIL PICK-UPS FOR PHONOGRAPHS AND THE LIKE

Thomas Stewart Marshall, Swindon, England, assignor to The Garrard Engineering and Manufacturing Company Limited, Swindon, England
Filed May 15, 1956, Ser. No. 585,014
Claims priority, application Great Britain May 20, 1955
7 Claims. (Cl. 179—100.41)

This invention relates to moving coil pick-ups for gramophones and the like.

Previously known methods of construction of moving coil pick-ups include suspending the coil on two diametrically opposed horizontal pivots about which it is free to rotate under the influence of a substantially co-axially disposed stylus operating in a record groove. The axis of the coil is vertical and some degree of vertical freedom of movement may be provided by cushioning the pivots in rubber or other resilient material; lateral movement of the coil is kept to a minimum by stiffness of the suspension system.

In an alternative construction, the moving coil is suspended with its axis horizontal on two diametrically opposed pivots, which in this case are disposed vertically. The stylus is coupled to the coil by a cantilever arm which projects forward at right angles to the pivotal axis of coil mounting, e.g. co-axially of the coil. This cantilever arm causes the coil to rotate under the influence of the stylus operating in a record groove and at the same time the resilience of the cantilever arm in the vertical plane allows the vertical movement of the stylus necessary to overcome what is termed "pinch effect" and to reduce needle "talk."

This freedom of vertical movement is a particular advantage of the cantilever arm construction and when applied to stylus mountings for moving coil pick-ups, the needle "talk" is much less than in the first described moving coil pick-up construction.

The object of the present invention is to provide an improved construction of moving coil pick-up for phonographs and the like which avoids certain disadvantages inherent in the pick-up constructions described above while retaining many of their advantages.

The invention consists in a moving coil pickup for phonographs and the like in which the moving coil is carried at the free end of a cantilever arm, the stylus being mounted directly or indirectly on the arm closely adjacent the coil.

According to a preferred construction of the present invention the cantilever arm is formed of a plurality of springy wires or rods coupled at one end to the coil former of the moving coil and at the other end to anchorage means whereby the cantilever arm and moving coil are mounted in the pick-up.

The wires or rods forming the cantilever arm are further preferably four in number disposed as upper and lower spaced pairs parallel to the plane on the coil windings and located above and below the plane of the moving coil. This arrangement permits the coil to vibrate torsionally and also vertically at the end of the cantilever arm and by causing the pairs of wires or rods to diverge, as viewed in plan, from the moving coil towards the anchorage means bodily lateral movement of the coil is restrained, so that the moving system of the pick-up has high vertical compliance to minimise pinch effect, high lateral compliance by virtue of the freedom of the system to vibrate torsionally to have good high frequency response while having nil or very low lateral movement prevents cancellation of torsional vibration and reduces the lateral stylus tip impedance.

A specific construction of cantilever arm, according to the present invention, comprises a coil former of elongated shape on which the moving wire (armature) is wound, an upper and lower pair of springy wire stirrups securedly attached at or adjacent their bend to the coil former so they extend from the coil former in substantial parallelism with the plane of the coil windings, the arms of each stirrup diverging away from the coil former to be clamped at the desired length of cantilever arm to an anchorage block adapted to be secured to the main (static) structure of the pick-up. In such a construction the stylus is secured adjacent the coil former, preferably passing through the interior of the former towards its outermost end and at an inclination to give a trailing disposition to the stylus point in known manner.

In order to control and restrain to the desired amount, the vertical compliance of the cantilever arm, damping means such as a resilient pad may be located on the main (static) structure of the pick-up so that it abuts against the face of the coil former remote from the stylus point.

Similarly in order to control or restrain the torsional compliance of the cantilever as necessary, independent damping means may be provided in the form of resilient pads or by filling the cavity round the moving coil with grease.

The construction of cantilever arm, according to the present invention, carrying at its end the moving coil, can be utilized very suitably in pick-ups of the turn over type in which two styli are provided for alternative use for playing coarse and micro groove records. Further the above cantilever construction employing wire or rods is simple to manufacture and by using duralumin or like light alloy wires or rods weight is considerably reduced.

As an alternative to the above wire or rod cantilever arm construction, the invention further consists in a moving coil pick-up construction, wherein the cantilever arm and the means supporting the coil are formed in one from a suitable material of the class generally termed "plastics," while the coil has no supporting means (i.e. former) other than the material comprising in part the cantilever arm, the coil being initially wound on a temporary mandrel, and the cantilever arm and the coil supporting means then moulded onto the coil in "plastic" and the mandrel removed. This method of manufacturing the coil, according to the present invention, can be contrasted with the method used hitherto of winding the coil directly onto a previously manufactured former on which the coil is retained.

In the construction of cantilever arm according to the preceding paragraph, the arm is thin in vertical section compared with its breadth in horizontal section, so that torsional vibration of the coil, together with high vertical compliance to overcome the pinch effect, are permitted while lateral movement of the coil is restrained. The torsional rigidity of the cantilever arm about its longitudinal axis may be reduced as necessary either by slotting the arm along its centre axis so that the slot is in a vertical plane when the arm is operating or by forming the cantilever arm with two parallel arms between the free ends of which the moving coil and stylus are carried. Further the cantilever arm may be straight in side profile or curved or of wavy form.

In the accompanying drawings:

Figure 1 is a side elevation, partly in section of one form of moving coil pick-up according to the present invention, Figure 2 is a section on the line 2—2 of Figure 1, and Figures 3, 4 and 5 are respectively, a side elevation, underneath plan and perspective view, of the moving coil arm assembly.

In carrying the invention into effect, according to one mode by way of example, a moving coil pick-up unit or cartridge, indicated generally at 1, of the turn-over type is mounted by means of a flange 2 on a bracket 3 to pivot about a stub shaft 4 in known manner.

In essential, the components of the pick-up unit comprise a main (static) structure or block 5, an opposed pair of permanent magnets 6, between the poles 7 of which moving coils 8 are mounted by means of cantilever arms 9 anchored by mounting blocks 10 to the main structure or block 5. Through each coil 8 a stylus 11 is secured to actuate the coil when a record is played, according to which stylus is in the playing position. The transduction effected by the stylus, coil and magnetic field of the magnets 6 is according to the known principles of moving coil pick-ups.

Each moving coil 8 is wound on an elongated former 12, having at one end a projecting bush 13 with an inclined tapered bore 14 in which the stylus 11 is accommodated. The cantilever arm 9 on which each moving coil former 12 is carried comprises two wire or rod stirrups 15, preferably of a suitable light metal alloy such as duralumin, which are secured one above the other parallel to the plane of the windings of the coil 8 adjacent as, for example, by a binding of plastic thread 16. The wire or rod stirrups 15 are bent back at 17 so that the stirrup arms 15a and 15b of each stirrup diverge away from the coil former 12 (see Figures 4 and 5), and are secured in the mounting block 10 which has three spacing and locating portions 10a, 10b and 10c (see Figure 3) together defining semi-circular grooves or chases 18 in which the diverging ends of the wire or rod stirrups 15 are firmly fixed, the stirrups and mounting block 10 being secured to the main (static) structure or block 5 by a screw or bolt 19. By this construction of the cantilever arms 9, the moving coil 8 is mounted to have good vertical compliance, as indicated by arrow 20, and good torsional compliance, as indicated by arrow 21, while being restrained against bodily lateral movement, as indicated by the arrow 22 (see Figure 5).

In order however, to control and restrain the vertical compliance to the desired amount a resilient pad 23 (see Figures 1 and 2) of plastic or other suitable material is carried by the main (static) structure or block 5 so that at each end it abuts against the faces of the coil formers 12 remote from the styli 11 to provide the necessary damping. The main structure or block 5 therefore has a recess 24 in its end face, preferably with two short lateral recesses 25 so that the pad 23 can be fitted into the recess 24 with locating blocks 26 on the pad 23 accommodated in the short lateral recesses 25 to locate the pad 23 positively. In order to control and restrain the torsional compliance to the desired amount, independent damping means are provided which may also be in the form of resilient padding (not shown) or which conveniently may comprise grease packed into the cavity 27 around the coil former 12 (see Figures 1 and 2).

The leads 28 and 29 from each moving coil 8 extend rearwardly from the coil through ducts 30 formed in the main structure or block 5 and are connected to pins 31 provided in known manner at the rear of the unit.

In order to protect the moving coil mechanism a cover 32 is fitted over the end of the main structure or block 5 and is secured thereto and the styli 11 project through slots or apertures 32 in the cover, preferably through resilient seals 33.

The foregoing description is of one form of the invention in which the moving coil is mounted with its associated stylus at the full end of a cantilever arm.

According to an alternative construction (not illustrated) the cantilever arm may be made of suitably springy "plastic" material. The moving coil may be wound on a former and attached to the "plastic" arm or the coil may be wound on a temporating mandrel and then be incorporated in the end of the "plastic" arm during casting of the latter. Such a "plastic" cantilever arm is preferably thin in vertical section compared with its breadth in horizontal section so that torsional vibration of the coil, together with high vertical compliance to avoid pinch effect, are permitted while lateral movement of the coil is restrained. The torsional rigidity of the "plastic" arm about its longitudinal axis may be reduced as necessary by slotting the arm along its central axis so that the slot is in a vertical plane when the arm is operating or by forming the arm with two parallel arms between the free ends of which the moving coil and stylus are carried. Further the cantilever arm may be straight in side profile or of curved or wavy form.

I claim:
1. In a phonograph pick-up, a relatively static support; an opposed pair of laterally spaced magnets fixed relative to said support; a coil former disposed between poles of said magnets; a coil wound on said former between its end surface; a stylus mounted directly on said former for moving the coil relative to said magnets; and a cantilever support for said former comprising a pair of vertically spaced horizontally elongated wire loop springs secured at one end to opposite end surfaces of said former and at the other end to said static support and lying in horizontal planes, said springs having sufficient lateral stiffness to inhibit bodily lateral movement of said former while providing for vertical and torsional displacement of said former and the entire vertical extent of the mass of the coil former and coil being disposed between said springs.

2. In a phonograph pick-up, a relatively static support; an opposed pair of laterally spaced magnets fixed relative to said support; a coil former disposed between poles of said magnets; a coil wound on said former between its end surface; a stylus mounted directly on said former for moving the coil relative to said magnets; and a cantilever support for said former comprising a pair of vertically spaced horizonally elongated wire loop springs secured at one end to opposite end surfaces of said former and at the other end to said static support and lying in horizontal planes, said springs having sufficient lateral stiffness to inhibit bodily lateral movement of said former while providing for vertical and torsional displacement of said former; the width of said wire loop springs increasing from said former toward said support and the entire vertical extent of the mass of the coil former and coil being disposed between said springs.

3. A phonograph pick-up as claimed in claim 2 in which said springs lie in vertically spaced parallel horizontal planes.

4. A phonograph pick-up as claimed in claim 3 in which the larger ends of the loops are seated in parallel arcuate grooves in a support element secured to the inner portion of said static support and said magnets are at the outer end of said static support.

5. A phonograph pick-up as claimed in claim 4 in which the smaller ends of the loops overlie opposite horizontal end surfaces of said coil former and are clamped to the latter.

6. A phonograph pick-up as claimed in claim 4 including damping means interposed between said coil former and the outer end of said static support.

7. A phonograph pick-up as claimed in claim 2 in which said loops are parallel to the planes of the windings of said coil.

References Cited in the file of this patent

UNITED STATES PATENTS

| | | |
|---|---|---|
| 1,986,583 | King | Jan. 1, 1935 |
| 2,027,169 | Harrison | Jan. 7, 1936 |
| 2,055,187 | Vieth | Sept. 22, 1936 |
| 2,133,815 | Harrison | Oct. 18, 1938 |
| 2,379,782 | Bobb | July 3, 1945 |
| 2,388,116 | Bruderlin | Oct. 30, 1945 |
| 2,591,996 | Arentzen | Apr. 8, 1952 |
| 2,593,633 | Umpleby | Apr. 22, 1952 |